(12) United States Patent
Creamer et al.

(10) Patent No.: US 7,260,537 B2
(45) Date of Patent: Aug. 21, 2007

(54) DISAMBIGUATING RESULTS WITHIN A SPEECH BASED IVR SESSION

(75) Inventors: Thomas E. Creamer, Boca Raton, FL (US); Brent L. Davis, Deerfield Beach, FL (US); Peeyush Jaiswal, Boca Raton, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 10/396,081

(22) Filed: Mar. 25, 2003

(65) Prior Publication Data

US 2004/0193403 A1 Sep. 30, 2004

(51) Int. Cl.
 *G10L 11/00* (2006.01)
 *G10L 21/00* (2006.01)
 *H04M 11/00* (2006.01)
 *H04M 3/42* (2006.01)

(52) U.S. Cl. ............... 704/270.1; 379/88.18; 379/207.13; 704/246; 704/251; 704/275

(58) Field of Classification Search ............ 704/270.1; 379/93.12
See application file for complete search history.

(56) References Cited

U.S. PATENT DOCUMENTS

| | | | |
|---|---|---|---|
| 5,771,276 A | 6/1998 | Wolf | |
| 6,061,433 A * | 5/2000 | Polcyn et al. ............ | 379/93.12 |
| 6,073,101 A | 6/2000 | Maes | |
| 6,088,669 A | 7/2000 | Maes | |
| 6,094,476 A | 7/2000 | Hunt et al. | |
| 6,101,486 A * | 8/2000 | Roberts et al. ............... | 705/27 |
| 6,205,204 B1 | 3/2001 | Morganstein et al. | |
| 6,219,646 B1 | 4/2001 | Cherry | |
| 6,324,513 B1 | 11/2001 | Nagai et al. | |
| 6,370,238 B1 | 4/2002 | Sansone et al. | |
| 6,377,662 B1 | 4/2002 | Hunt et al. | |

(Continued)

FOREIGN PATENT DOCUMENTS

EP 0903920 3/1999

(Continued)

OTHER PUBLICATIONS

U.S. Appl. No. 09/421,363, filed Oct. 19, 1999, Mei, et al.

(Continued)

*Primary Examiner*—Tālivaldis Ivars Šmits
*Assistant Examiner*—Justin W Rider
(74) *Attorney, Agent, or Firm*—Akerman Senterfitt

(57) ABSTRACT

Within an interactive voice response system, a method of automatically disambiguating results presented to a user can include determining the identity of a user within an interactive voice response session, receiving user inputs specifying selections in an interactive voice response menu hierarchy, and storing historical information specifying the user selections within a profile associated with the identity of the user. For at least one subsequent input from the user, identifying the historical information associated with the identity of the user and using the historical information to reduce a number of possible selections in the interactive voice response menu hierarchy which are presented to the user.

11 Claims, 2 Drawing Sheets

| User A | | | | | |
|---|---|---|---|---|---|
| Date | Time | Originating Number | Path | Destination | Result |
| 3/15/03 | 08:12:00 | 123-456-7890 | 1, 3, 7 | H | Listing 5 |
| 3/16/03 | 14:10:00 | 234-123-7890 | 1, 4 | E | - |
| 3/17/03 | 15:16:00 | 123-456-7890 | 1, 3, 7 | H | Listing 5 |

U.S. PATENT DOCUMENTS

| | | |
|---|---|---|
| 6,385,304 B1 | 5/2002 | Hunt et al. |
| 6,421,672 B1 | 7/2002 | McAllister et al. |
| 6,477,491 B1 | 11/2002 | Chandler et al. |
| 2001/0029452 A1 | 10/2001 | Chen |

FOREIGN PATENT DOCUMENTS

| | | |
|---|---|---|
| EP | 0973314 | 1/2000 |
| GB | 2292500 | 2/1996 |
| WO | WO0150453 | 7/2001 |

OTHER PUBLICATIONS

U.S. Appl. No. 07/994,036, filed Dec. 21, 1992, Nelson, et al.

"Using Interactive Voice Response Technology With Computer Links Employing Computer Telephony Integration," IBM Tech. Disclosure Bul., vol. 38, No. 4, pp. 29-30, (Apr. 1995).

"Method for Exposing Personalized Messages to a Caller," IBM Tech. Disclosure Bul., vol. 36, No. 06A, pp. 259-260, (Jun. 1993).

* cited by examiner

DISAMBIGUATING RESULTS WITHIN A SPEECH BASED IVR SESSION

BACKGROUND

1. Field of the Invention

This invention relates to the field of interactive voice response systems and, more particularly, to processing user inputs and information determined by interactive voice response systems.

2. Description of the Related Art

To function effectively, speech recognition-based interactive voice response (IVR) systems must be able to distinguish between ambiguous search results and/or multiple menu selections from a user. For example, as a caller or user traverses through an IVR menu hierarchy, the caller is presented with one or more possible menu selections. If the caller is presented with more than one possible menu selection, the IVR system must disambiguate the user specified menu selection from the other possible menu selections. This process can involve speech recognizing user utterances and/or processing dual tone multi-frequency (DTMF) signals received over a telephony link. Accordingly, in order to distinguish the user selected IVR menu selection from the other possible selections, the IVR system must rely upon significant speech and/or signal processing resources to comprehend the user input.

Several solutions have been proposed for performing disambiguation. One such solution is directed to prompting the caller for additional information which may be used to distinguish one data item from another. For instance, if the caller is asked to select among multiple search results which are presented as possible menu selections, the additional information supplied by the caller can be used to distinguish among those menu selections.

This technique, however, suffers from several disadvantages. In particular, this technique places the burden of distinguishing between results upon the caller, who may or may not be in possession of the necessary information. Additionally, the IVR system utilizes additional processing resources when conducting further dialogs with the caller to elicit this information and process the caller inputs. Also, this technique is limited to distinguishing among query results such as data items within a data processing system that is either included within or communicatively linked to the IVR system. The caller is not aided in navigating the IVR menu hierarchy and the amount of resources required to process received caller inputs is not reduced.

Another proposed solution for performing disambiguation has been to store statistical information detailing which search results are selected most often as preferred choices by all users who access the IVR system. When multiple search results are returned as possible menu selections in response to a user query, the result which is selected most often by all users having accessed the IVR system can be presented as a preferred menu selection.

This technique also suffers from several disadvantages. In particular, this technique is directed to the entire population of callers who access the IVR system and cannot function on a per caller basis. Further, like the disambiguation technique previously discussed, this technique is limited to disambiguating among similar data items and does not aid the caller in navigating the IVR menu hierarchy.

Yet another proposed solution has been to allow a caller to navigate to a desired location within the IVR menu hierarchy and issue a command to store that location as a shortcut. The next time the same caller accesses the IVR system, the, IVR system can present the shortcut as a menu option thereby allowing the user to circumvent one or more menu selections within the IVR menu hierarchy to arrive at the destination more quickly. This technique, like the others, places the burden upon the caller to essentially bookmark a location within the IVR menu hierarchy in a manual fashion.

SUMMARY OF THE INVENTION

The present invention can reduce the amount of disambiguation which an IVR system is to perform. According to the present invention, user-specific profiles can be maintained which can be accessed by an interactive voice response (IVR) system. The user profiles can include historical information specifying navigational paths through an IVR menu hierarchy which the user has previously navigated during IVR sessions. The user profiles can store additional information such as personal preferences, frequently taken exit points, past IVR system queries, and selections of particular query results. The user profiles can be maintained for each user or caller, particular groups of users, frequent users, and the like.

The present invention can reduce the need for disambiguation by limiting the number of selections that are presented to a user. Reduction of the available speech menu options can result in increased speech recognition accuracy. Further, as the number of database lookups required for disambiguation can be reduced, IVR session duration as well as call duration can be reduced which can lead to increased IVR system performance and capacity.

One aspect of the present invention can include a method of automatically disambiguating results presented to a user within an IVR system. The method can include determining the identity of a user within an IVR session, receiving user inputs specifying selections in an IVR menu hierarchy, and storing historical information specifying the user selections within a profile associated with the identity of the user. For at least one subsequent input from the user, the historical information associated with the identity of the user can be identified. The historical information can be used to reduce a number of possible selections in the IVR menu hierarchy which are presented to the user.

According to one embodiment of the present invention, the user inputs can specify a path through the IVR menu hierarchy. In that case, the step of using the historical information can include reducing the number of possible path selections. In another embodiment of the present invention, the subsequent user input can be received during a second IVR session. Accordingly, the step of using the historical information can include comparing a path being traversed during the second IVR session with at least one path specified by the historical information, determining at least one path specified by the historical information which corresponds with the path being traversed during the second IVR session, and presenting the corresponding at least one path to the user as a possible IVR menu selection.

In another embodiment of the present invention, at least one of the user inputs can specify a query. The method can include determining one or more results responsive to the query and receiving a disambiguating user input specifying one or more particular results from the determined results. Accordingly, the historical information can specify the particular result, the subsequent input can specify a query yielding one or more results for which historical information has been stored, and the potential selections which are reduced during the step of using the historical information can be the results of the subsequent query. Notably, the subsequent input can be received during a second IVR session.

Another aspect of the present invention can include an IVR system for automatically disambiguating results presented to a user. The IVR system can include means for determining the identity of a user within an IVR session, means for receiving user inputs specifying selections in an IVR menu hierarchy, and means for storing historical information specifying the user selections within a profile associated with the identity of the user. The system can include means for identifying the historical information associated with the identity of the user for one or more subsequent inputs from the user and means for using the historical information to reduce a number of possible selections in the IVR menu hierarchy which are presented to the user.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The invention disclosed herein provides a method and apparatus for resolving ambiguities within interactive voice response (IVR) systems. The present invention can automatically collect historical information detailing user interactions with the IVR system and store the historical information within a user specific profile. The historical information can specify user menu selections which can include user inputs and/or selections which the user made during the course of navigating through the IVR menu hierarchy. The menu selections can specify the path taken by the user through the IVR menu hierarchy. Menu selections also can include user queries and/or query results as a user is often presented with one or more query results in menu format and asked to specify a particular or desired result.

Figure 1:
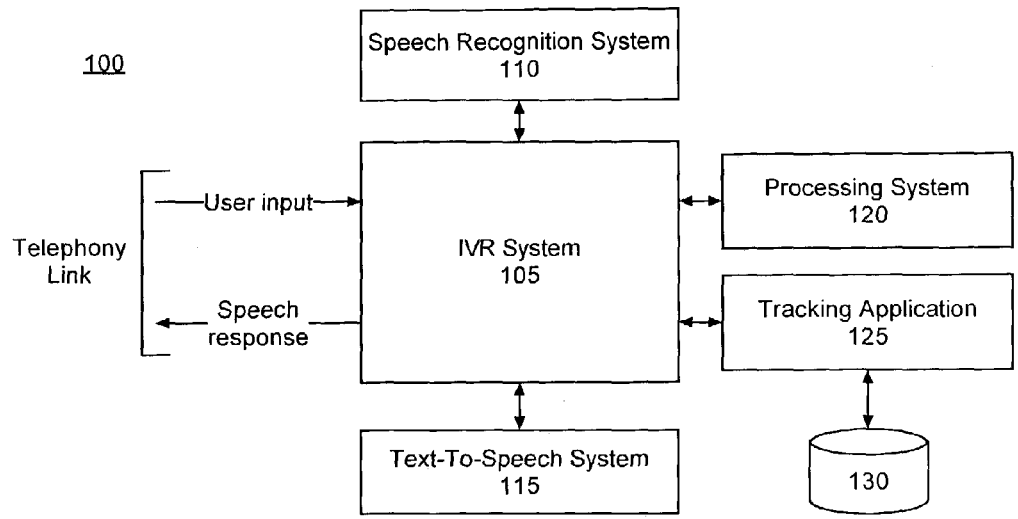
FIG. 1 is a schematic diagram illustrating a call processing system 100 in accordance with the inventive arrangements disclosed herein.

FIG. 1 is a schematic diagram illustrating a call processing system 100 in accordance with the inventive arrangements disclosed herein. As shown, the system 100 can include call processing resources and speech processing resources. More particularly, the system 100 can include an IVR system 105, a speech recognition system (SRS) 110, and a text-to-speech (TTS) system 115. Additionally, the system 100 can include a processing system 120, a tracking application 125, as well as a data store 130.

The IVR system 105 can answer received telephone calls and perform call processing functions such as routing calls to particular internal extensions or external telephone numbers. The IVR system 105 can include a hierarchical menu through which callers can navigate to make requests, query for information, receive information, initiate calls, and/or redirect an "in-progress" telephone call. Accordingly, the IVR system 105 can interact with callers by conducting a dialog as determined by the IVR menu hierarchy and the caller selections made within that menu hierarchy. While the IVR system 105 includes voice processing functions, it should be appreciated that the IVR system 105 also can receive and process dual tone multi-frequency (DTMF) signals received via a telephony link.

The IVR system 105 can direct user speech received over an established telephony link to the SRS 110, receive speech recognized text from the SRS 110, provide text to the TTS system 115, and receive audible speech generated by the TTS system 115 which can, be provided back to a caller over the telephony link.

The processing system 120 can be an application specific back-end processing system, for example a directory assistance application, a financial transaction processing platform, or any of a variety of other data processing platforms which can receive instructions from a speech and/or telephony interface and provide information to such an interface. Once user selections and/or queries are converted to text and processed by the IVR system 105, the processing system 120 can receive and process those selections and/or queries as well as provide response information back to the IVR system 105.

The tracking application 125 can maintain the data store 130. More particularly, the tracking application 125 can store selections made by users during the course of navigating the IVR system 105 menu hierarchy. Information can be stored within the historical data store 130, for example within one or more user specific profiles. The profiles can include information such as the particular menu items or nodes accessed or traversed by a caller during an IVR session, which data items or search results had been selected as preferred, for example, in the case where a user query yields more than one search result, as well as IVR session information such as the time of the user's call, the date of the user's call, and the number from which the user called.

In operation, the IVR system 105 can receive speech input from a caller and provide the speech to the SRS 110 for recognition. The speech recognized text can be provided back to the IVR system 105 for further processing. For example, the IVR system 105 can determine whether the user has selected a menu option or initiated a query. Once a determination has been made as to the caller's intention, the IVR system 105 further can prompt the caller, for example by providing a text prompt to the TTS system 115 and relaying received audio to the caller via the telephony link. A query, once speech recognized and converted to a format which can be understood by the processing system 120, can be routed to the processing system 120. Still, depending upon the caller's location within the IVR system 105 menu hierarchy and the caller's responses, the caller can be transferred to another extension or telephone number.

As the caller makes selections and traverses the IVR system 105 menu hierarchy, the tracking application 125 can monitor the caller's selections and record those selections within the data store 130. As noted, the caller's query, results from the caller's query, one or more results which the user has selected from multiple results returned in response to the query, or any combination thereof can be stored within the data store 130.

Thus, for newly received user queries or user selections of menu items, the IVR system 105 can interact with the tracking application 125 and the data store 130 to determine whether the information stored therein matches a current path being navigated by the user, matches a series of results returned responsive to a query, or matches the query which was initiated by the caller. If a match is determined, then the stored historical information can be used to reduce the options which are presented to the user. For example, a previously taken path or query result can be presented to the user automatically.

The various components of the call processing system 100 of FIG. 1, for example the IVR system 105, the SRS 110, the TTS system 115, and the tracking application 125, have been provided for purposes of illustration. As such, those skilled in the art will recognize that these components can be implemented as discrete components and/or systems as shown, combined into a single larger application program and/or computer system, or implemented as any combination thereof. Further, the call processing system 100 can incorporate an audio playback system for providing audio prompts in combination with or in place of the TTS system 115.

Figure 2:
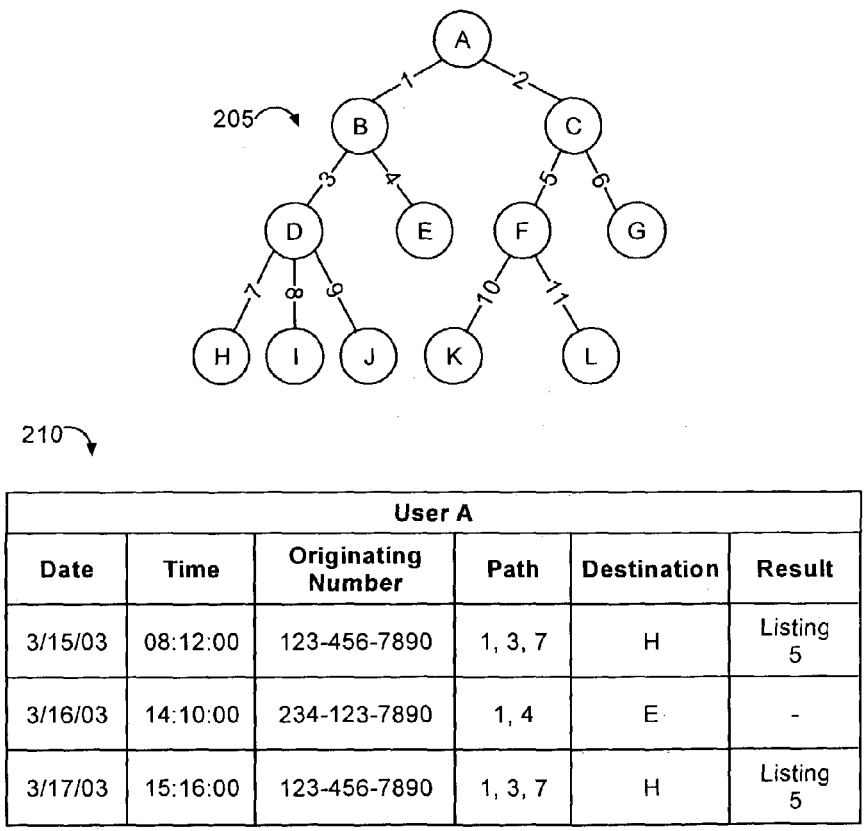
FIG. 2 is a schematic diagram illustrating an exemplary excerpt from an interactive voice response system menu hierarchy and an exemplary user profile including historical information.

FIG. 2 is a schematic diagram illustrating an exemplary excerpt 205 from an IVR system menu hierarchy and an exemplary user profile 210 including historical information. The IVR menu excerpt 205 (hereafter IVR menu), can include a series of nodes which are referenced with letters A through L. The nodes represent points within the IVR menu 205 at which a caller can select from one or more different choices corresponding to different paths through the IVR menu 205. Thus, for example, at each node which has one or more child nodes extending therefrom, the user can be presented with menu selections, asked for an input, or asked to specify a query. The menu selections can correspond to different paths or branches through the IVR menu, which have been numbered for reference. Menu selections also can correspond to different results determined from a previously initiated user query as each result can be associated with a particular branch, and the selection of a particular result can cause the user to navigate down the path associated with the selected result. At terminal nodes, or nodes that have no child nodes extending therefrom, an action other than moving to another menu node can be performed such as a call transfer, the presentation of determined search results, call termination, or the like.

The user profile 210, as shown, is specific to "User A". The user profile 210 can include times when a call was received, the date the call was received, as well as the originating number. The column labeled "Path" can specify the particular path that was traversed by the user during the call or IVR session. The path can be specified using branch indicators as shown or can be specified using identifiers which correspond to the nodes of the IVR menu. Accordingly, the first entry for User A indicates that on Mar. 15, 2003, the user navigated branches 1, 3, and 7 or traversed nodes A, B, D, and H. Each node and/or path of the IVR menu that is traversed during a user's IVR session can be recorded.

The "Result" column can be used to indicate the particular result that was selected in the event that more than one result is determined responsive to a user query. For example, if listings 1, 2, 3, 4, and 5 were returned responsive to a user query and the user selected listing 5, the result column can specify "listing 5". Additional columns can be included for storing the user's particular query or queries and the one or more results which are determined responsive to the query.

It should be appreciated that the historical data can be arranged using any of a variety of storage and/or arrangement techniques. For example, each IVR session can correspond to a single entry in the user profile. Each entry can include multiple data items of the same type. For instance, if the user specifies more than one query, the IVR session entry can include multiple result data items, each specifying results for one of the different queries.

Alternatively, each IVR session can be formed of multiple entries wherein each entry can correspond to a particular part of the overall path traversed by the user through the IVR menu. For example, the current entry can be closed and, new entry begun responsive to the user initiating a new query, when particular nodes are traversed, or after a particular number of nodes is traversed. In illustration, a new entry can be started when the user navigates through particular nodes such as nodes D, E, F, and/or G, which form the second row of nodes within the IVR menu 205, after each new query, or after traversing 3, 4, or 5 nodes of the IVR menu 205.

In any case, although the user profile 210 is illustrated as a table, the user profiles and data store are not so limited. Rather, any of a variety of data storage formats can be used. For example, the historical information can be stored using a database, a linked list or any other suitable data storage technique and/or format. Additionally, it should be appreciated that the nodes and linking segments or branches have been identified for purposes of illustration. Any of a variety of different referencing techniques can be used which allow the tracking application to monitor and store user selections, queries, query results, and particular paths through the IVR menu 205.

Figure 3:
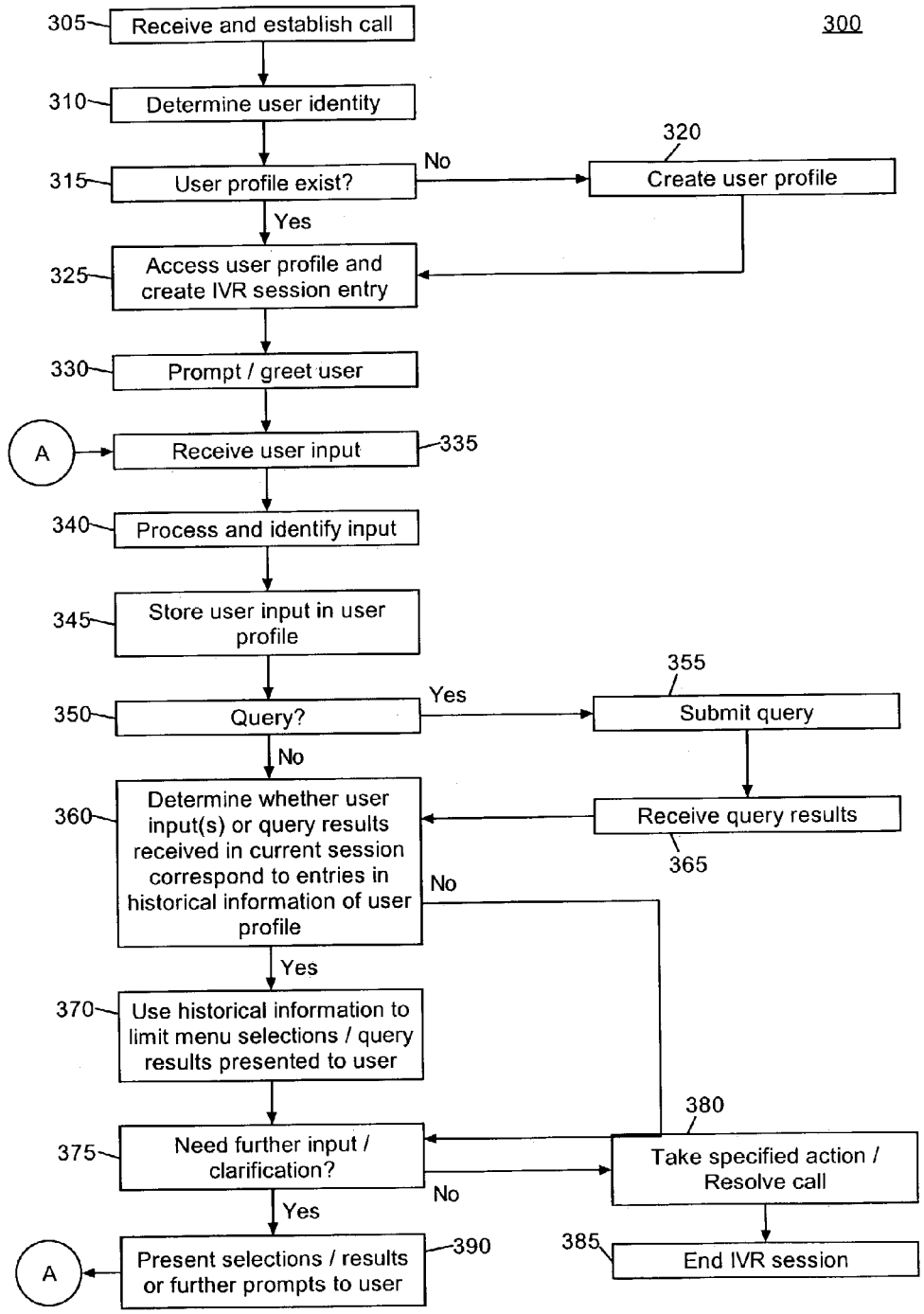
FIG. 3 is a flow chart illustrating a method of performing disambiguation in accordance with the inventive arrangements disclosed herein.

FIG. 3 is a flow chart illustrating a method of performing disambiguation in accordance with the inventive arrangements disclosed herein. The method 300 can begin in step 305 where a call can be received. Accordingly, the IVR system can answer the call thereby establishing a telephony link with the user. In step 310, the IVR system can identify the user. User identification can be performed using any of a variety of different techniques. For example, the IVR system can rely upon a caller ID feature to automatically identify the user using the originating number. Alternatively, the IVR system can engage the user in a dialog so as to obtain identifying information such as a username, password, or the like to properly identify the user.

In step 315, after having identified the user, a determination can be made as to whether a profile exists for the user. If not, the method can proceed to step 320 where a user profile associated with the user can be created. From either step 315 or step 320, the method can proceed to step 325 where the user profile for the current user can be identified and accessed. Within the identified user profile, an entry can be started for the current call or IVR session. For example, within the entry, the date and time in which the call was received can be stored. Additional information such as the telephone number from which the user is calling also can be stored if this information is available. Notably, if the user's originating number is available, the IVR system can further tailor menu selections and/or filter query results according to the user's historical data, including the user's historical data for the particular number from which the user initiated the call.

In step 330, the IVR system can greet and/or prompt the user with one or more possible menu selections from which to choose. In step 335, a user input can be received in response to the presented menu selections and/or greeting. As noted, the user input can be in the form of a DTMF input and/or a speech response.

In step 340, the received input can be processed and identified for a type. More particularly, if the input is in the form of a DTMF input, the received DTMF signals can be translated to the particular menu option that the received input is selecting. If the received input is in the form of a speech input, the user speech can be recognized and can be matched with the menu selection that the speech input is selecting. For example, if the user was prompted to "select 1 for finance, 2 for human resources, or 3 for customer service", the user could press or say "1", "2", or "3". Thus, either the DTMF signal or the user speech can be interpreted to determine the user specified selection of finance, human resources, or customer service.

Notably, if one of the menu options was to specify a query, the user can speak a query which can be recognized and converted to text. For example, the IVR system can prompt the user to "select 1 for finance, 2 for human resources, 3 for customer service, or speak the name of the person with whom you wish to speak". Accordingly, the IVR system can determine that the input type is a query if the user has provided a spoken utterance which does not match a specific IVR menu selection and the user also had an option of specifying a query. In this case, for example, the user had an option of specifying a query and if a name is uttered, the user specified name will not match options 1, 2, or 3.

In step 345, the user's input can be stored within the user's profile and associated with the newly created entry for the current IVR session. As the user specified selection corresponds to either an identifiable node or branch of the IVR menu, depending upon the particular implementation or manner of tracking the user's path through the IVR menu, the user selection can be stored. If the user input was a query, once recognized, the text of the query or keywords selected or recognized from the query can be stored within the user profile and associated with the newly created entry for the current IVR session.

In step 350, a determination can be made as to whether the received user input was a query. If so, the method can proceed to step 355 where the query, once recognized and translated to a suitable format compatible with the processing system, can be submitted to the processing system. In step 365, results from the submitted query can be received.

In step 360, a determination can be made as to whether any received user inputs specifying a path through the IVR menu or query results received in the current session correspond to historical information of the user's profile. If so, the method can proceed to step 370. If not, the method can proceed to step 375.

Continuing with step 370, in the case where stored historical information is applicable to the current dialog context, the historical information can be used to limit the menu selections or query results which are presented to the user. For example, if the user has traversed the same path during a previous IVR session as is presently being traversed, then the possible menu selections can be limited to only those which have been selected by the user in the past for the same path. Thus, the user can easily navigate a previously traversed path through the IVR menu. The menu selections also can be limited to those which the user has previously selected when at the same node in the IVR menu regardless of the particular path taken to that node. The user can be provided with additional prompts or options which allow the user to indicate that he or she wishes to hear all available menu selections.

If the user is receiving query results, for example in the case where the user has asked for the telephone number or other information for a particular person, the historical information can be used to limit the presentation of duplicative query results. For instance, if multiple hits for a person named "John Smith" are determined, only the result or results which have been previously selected by the user need be presented to the user as available menu selections. As noted, the user can be provided with the opportunity to ask for all determined query results.

In similar fashion, if the particular node to which the user has navigated can receive a user specified query, then the IVR system can prompt the user as to whether any of the stored queries from past IVR sessions which correspond to the current path and/or node should be issued to the data processing system. Accordingly, the user can command the IVR system to reissue a query stored in the user's profile which was issued at the same node within the IVR menu in the past or reissue a query from the user's profile which was issued in the past while at the same node within the IVR menu during a same or similar navigational path through the IVR menu. Still, the user can opt to specify a new query.

In step 375, a determination can be made as to whether additional user input is required to disambiguate menu selections and/or query results. For example, the case can arise where the historical information reduces the number of available IVR menu items and/or query results, but is unable to limit the selections to a single menu item or query result. The case also can arise where the historical information is not applicable to the current IVR menu state or dialog and therefore cannot be used to limit the available IVR menu items and/or query results. In either case, the method can proceed to step 390 where any available IVR menu items and/or query results can be presented to the user so that the user can select from among the available options. The method can proceed to jump circle A and repeat as necessary.

If no further user input is required to determine a course of action, the method can proceed to step 380. In step 380, a particular action can be taken such as connecting the user to the appropriate extension or telephone number, providing the user requested information, or the like. The method then can proceed to step 385 where the current IVR session can end.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. Within an interactive voice response system, a method of automatically disambiguating results presented to a user comprising:

determining the identity of a user within an interactive voice response session;

receiving user inputs in response to presenting menu options during the interactive voice response session, wherein said presented menu options specify at least one of a plurality of hierarchical nodes of the voice response menu hierarchy, wherein each of said nodes corresponds to points within the interactive voice response menu hierarchy at which the user can choose to traverse one or more child nodes, wherein said user inputs specify at least one among a user selection of one of said presented menu options and a user query of said nodes of said voice response menu hierarchy;

storing historical information specifying the received user inputs within a profile associated with the identity of the user, wherein the user profile specifies at least one among a path that was traversed during the interactive voice response session and at least a portion of a user query recognized during the interactive voice response session, wherein the path being specified by at least one branch indicator links a parent node and a child node;

for at least one subsequent input from the user, identifying the historical information associated with the identity of the user; and using the historical information to reduce a number of possible nodes from the interactive voice response menu hierarchy which are presented to the user, wherein the number of possible selections is reduced in response to at least one among a current path matching a path specified in the user profile and a current query matching a recognized query specified in the user profile.

2. The method of claim 1, wherein said step of using the historical information comprises reducing the number of possible path selections.

3. The method of claim 2, wherein said subsequent user input is received during a second interactive voice response session, said step of using the historical information further comprising:

comparing a path being traversed during the second interactive voice response session with at least one path specified by the historical information;

determining at least one path specified by the historical information which corresponds with the path being traversed during the second interactive voice response session; and presenting the corresponding at least one path to the user as a possible interactive voice response menu selection.

4. The method of claim 1, wherein at least one of the user inputs specifies a query, said method further comprising:

determining a plurality of results responsive to the query; and receiving a disamnbiguating user input specifying a particular result from the plurality of results;

wherein the historical information specifies user selected query results, the subsequent input specifies a query yielding a plurality of results for which historical information has been stored, and the potential selections which are reduced during said step of using historical information are the results of the subsequent query.

5. The method of claim 4, wherein said subsequent input is received during a second interactive voice response session.

6. A computer-readable storage, having stored thereon a computer program having a plurality of code sections executable by a machine for causing the machine to perform the steps of:

determining the identity of a user within an interactive voice response session;

receiving user inputs in response to presenting menu options during the interactive voice response session, wherein said presented menu options specify at least one of a plurality of hierarchical nodes of the voice response menu hierarchy, wherein each of said nodes corresponds to points within the interactive voice response menu hierarchy at which the user can choose to traverse one or more child nodes, wherein said user inputs specify at least one among a user selection of one of said presented menu options and a user query of said nodes of said voice response menu hierarchy;

storing historical information specifying the received user inputs within a profile associated with the identity of the user, wherein the user profile specifies at least one among a path that was traversed during the interactive voice response session and at least a portion of a user query recognized during the interactive voice response session, wherein the path being specified by at least one branch indicator links a parent node and a child node;

for at least one subsequent input from the user, identifying the historical information associated with the identity of the user; and using the historical information to reduce a number of possible nodes from the interactive voice response menu hierarchy which are presented to the user, wherein the number of possible selections is reduced in response to at least one among a current path matching a path specified in the user profile and a current query matching a recognized query specified in the user profile.

7. The computer-readable storage of claim 6, wherein said step of using the historical information comprises reducing the number of possible path selections.

8. The computer-readable storage of claim 7, wherein said subsequent user input is received during a second interactive voice response session, said step of using the historical information further comprising:

comparing a path being traversed during the second interactive voice response session with at least one path specified by the historical information;

determining at least one path specified by the historical information which corresponds with the path being traversed during the second interactive voice response session; and presenting the corresponding at least one path to the user as a possible interactive voice response menu selection.

9. The computer-readable storage of claim 6, wherein at least one of the user inputs specifies a query, said method further comprising:

determining a plurality of results responsive to the query; and receiving a disambiguating user input specifying a particular result from the plurality of results;

wherein the historical information specifies user selected query results, the subsequent input specifies a query yielding a plurality of results for which historical information has been stored, and the potential selections which are reduced during said step of using historical information are the results of the subsequent query.

10. The computer-readable of claim 9, wherein said subsequent input is received during a second interactive voice response session.

11. An interactive voice response system for automatically disambiguating results presented to a user, said interactive voice response system comprising:

means for determining the identity of a user within an interactive voice response session;

means for receiving user inputs in response to presenting menu options during the interactive voice response session, wherein said presented menu options specify at least one of a plurality of hierarchical nodes of the voice response menu hierarchy, wherein each of said nodes corresponds to points within the interactive voice response menu hierarchy at which the user can choose to traverse one or more child nodes, wherein said user inputs specify at least one among a user selection of one of said presented menu options and a user query of said nodes of said voice response menu hierarchy;

means for storing historical information specifying the received user inputs within a profile associated with the identity of the user, wherein the user profile specifies at least one among a path that was traversed during the interactive voice response session and at least a portion of a user query recognized during the interactive voice response session, wherein the path being specified by at least one branch indicator links a parent node and a child node;

means for identifying the historical information associated with the identity of the user for at least one subsequent input from the user; and using the historical information to reduce a number of possible nodes from in the interactive voice response menu hierarchy which are presented to the user, wherein the number of possible selections is reduced in response to at least one among a current path matching a path specified in the user profile and a current query matching a recognized query specified in the user profile.

\* \* \* \* \*